United States Patent [19]
Perkins et al.

[11] Patent Number: 6,020,996
[45] Date of Patent: Feb. 1, 2000

[54] TELESCOPE AND ACCESSORY CODING SYSTEM AND METHOD

[75] Inventors: William C. Perkins, Lenexa, Kans.; Darin M. Stephens, Independence, Mo.; Eric J. Wangler, Orchard Park, N.Y.

[73] Assignee: Bushnell Corporation, Overland Park, Kans.

[21] Appl. No.: 09/128,825

[22] Filed: Aug. 4, 1998

[51] Int. Cl.[7] .................................................. G02B 23/00
[52] U.S. Cl. ........................... 359/399; 359/896; 359/900
[58] Field of Search .................................. 359/399–431, 359/900, 896, 480–482; 364/423.098, 424.01; 112/258

[56] References Cited

U.S. PATENT DOCUMENTS 3,745,952   7/1973  Giesselmann ............................ 112/258
5,650,929   7/1997  Potter et al. ...................... 364/423.098

*Primary Examiner*—Thong Nguyen
*Attorney, Agent, or Firm*—Litman, Kraai & Brown, L.L.C.; John C. McMahon

[57] ABSTRACT

A telescope and accessory coding system and method includes the association of a unique respective icon, color, or other symbol with each one of a number of optical accessory types which are usable with a telescope, either alone or in optical series with other accessory types. A representation of the symbol which represents that accessory type is placed on each accessory of that type. Furthermore, each accessory of an accessory type which is capable of receiving other accessory types has placed thereon representations of symbols representing those other accessory types which are optically compatible therewith.

17 Claims, 1 Drawing Sheet

TELESCOPE AND ACCESSORY CODING SYSTEM AND METHOD

FIELD OF THE INVENTION

The present invention relates to a telescope and accessory coding system and method, and, more particularly, to such a system and method in which each one of a number of telescope accessory types is assigned a particular coded icon or symbol. A viewing end of the telescope and each one of the telescope accessories which is capable of receiving another accessory are provided with representations of each coded icon or symbol which corresponds to those accessory types which are optically compatible with it.

BACKGROUND OF THE INVENTION

Astronomical telescopes are becoming ever more popular with consumers as their prices have come down. Quality astronomical telescopes are now widely available at fairly reasonable costs. This has created a large number of inexperienced users of astronomical telescopes. It is common for such telescopes to come equipped with a variety of accessories, including, for example, various ocular lenses, erecting lenses, Barlow lenses, prismatic diagonals, etc. Many other accessory types are also available, including a penta mirror diagonal and special zoom lens which are available from the assignee of the present invention.

A problem arises when an inexperienced user attempts to use multiple accessories in series which are, in fact, optically incompatible. For example, compound lens systems such as are found in an erector lens, a zoom lens or a Barlow lens significantly reduce the amount of light reaching a user. Prismatic diagonals are also compound lens systems which considerably reduce the total light transmitted there through. The light penalty associated with combining some of such compound lenses in series, e.g. associating a prismatic diagonal with a zoom lens, is too great for practical viewing. Thus, the zoom lens cannot be used in conjunction with a Barlow lens and a Barlow lens should not be used with an erector lens. Finally, due to practical limitations, the zoom lens cannot be used with an astronomical telescope without also using the penta mirror diagonal.

It is clear, then, that a need exists for a system and method which prevents an inexperienced user from attempting to use optically incompatible telescope accessories in series with one another. Such a system and method should be inexpensive and easy to implement, yet also easy to understand.

SUMMARY OF THE INVENTION

The present invention is directed to a telescope and accessory coding system and method. The system and method includes associating a unique respective icon, color, or other symbol with each one of a number of optical telescope accessory types and placing a representation of the respective icon, color, etc. on each accessory of that type near the insertion or objective end thereof. At the same time, any of the accessories which are capable of receiving other(s) of the accessories (hereinafter called "receiving accessories"), as well as the telescope viewing end itself, have placed thereon representations of each icon or symbol which represents an accessory type with which it is optically compatible. Thus, for example, a Barlow lens and an erector lens, which are not optically compatible with each other, will not have each other's icon or symbol on their respective receiving ends but they will have the symbols of other optical lenses, prismatic diagonals, penta mirror diagonals, etc., with which they are optically compatible.

OBJECTS AND ADVANTAGES OF THE INVENTION

The principal objects of the present invention include: providing a telescope and accessory coding system and method; providing such a system and method in which individual respective codes or icons are associated with each of a plurality of optical telescope accessory types, with representations of the respective icon or symbol being placed on each accessory of that type; providing such a system and method in which the telescope viewing end and each accessory capable of receiving another accessory are provided with representations of a symbol for each accessory type with which they are optically compatible; providing such a system and method which can prevent the simultaneous use of optically incompatible telescope accessories; providing such a system and method which is economical to produce and to implement; and providing such a system and method which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

The sole drawing FIGURE is a schematic diagram of a viewing end of an astronomical telescope along with a plurality of optical accessories usable therewith, all of which are equipped with the inventive coding system and method.

DETAILED DESCRIPTION OF THE INVENTION

Figure 1:
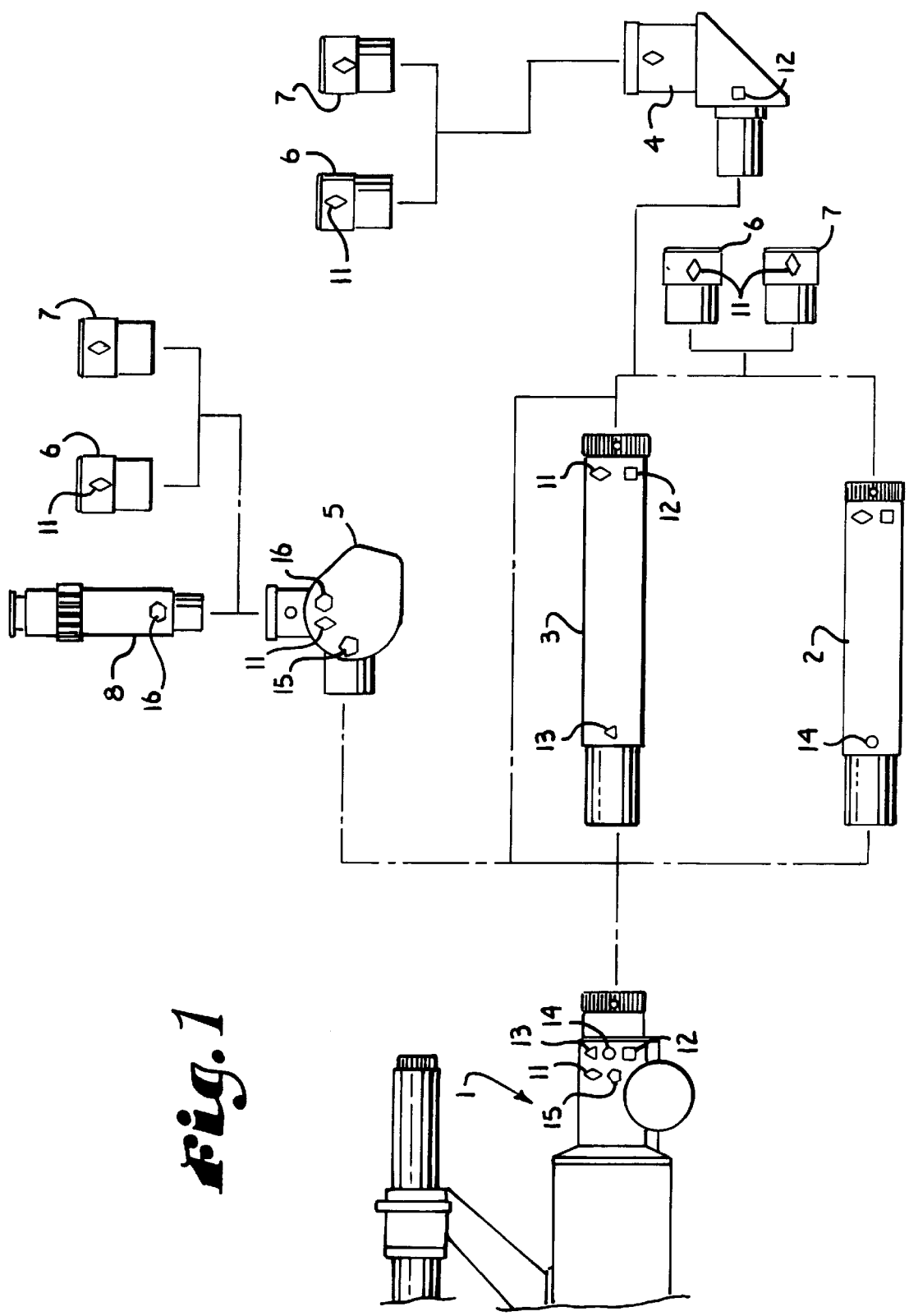

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawing FIGURE, a viewing end of an astronomical telescope is generally indicated at 1. A number of optical accessories and accessory types are also illustrated, including a Barlow lens 2, an erector lens 3, a prismatic diagonal 4, a penta mirror diagonal 5, a pair of optical eyepieces 6 and 7, and a zoom lens 8. Each of the accessories 2–8 includes an individual respective symbol attached thereto near an insertion or objective end thereof which symbols represent that particular accessory type in the inventive coding system, as described below.

In the particular coding system illustrated herein, a diamond symbol 11 is provided which represents an eyepiece accessory type and a diamond symbol 11 is placed near the insertion or objective end of each eyepiece 6 and 7. A square symbol 12 represents a prismatic diagonal accessory type and a square symbol 12 is placed on the prismatic diagonal 4 near the insertion or objective end thereof. A triangle symbol 13 represents an erector lens accessory type and a triangle symbol 13 is placed on the erector lens 3 near an insertion or objective end thereof. A circle symbol 14 represents a Barlow lens accessory type and a circle symbol 14 is placed on the Barlow lens 2 near an objective or insertion end thereof. A pentagon symbol 15 represents a penta mirror diagonal accessory type and a pentagon symbol 15 is placed on the penta mirror diagonal 5 near the insertion or objective end thereof. Finally, a hexagon 16 represents a zoom lens accessory type and a hexagon symbol 16 is placed on the zoom lens 8 near the insertion or objective end thereof.

An additional part of the inventive coding system is the placement of representations of one or more symbols on each accessory of a receiving accessory type, as well as on the viewing end of the telescope 1, which symbol(s) represent those accessories which are optically compatible with that receiving accessory type or directly with the telescope viewing end 1 itself.

For example, the penta mirror diagonal 5 is usable with either the zoom lens 8 or the eyepieces 6 and 7. Therefore, to represent the compatibility of these accessories, a diamond symbol 11 and a hexagon symbol 16 are placed on the penta mirror diagonal 5 near the objective, receiving end thereof. The Barlow lens 2 is usable with the prismatic diagonal 4 or the ocular eyepieces 6 and 7, and, therefore, a diamond symbol 11 and a square symbol 12 is placed on the Barlow lens 2 near the viewing or receiving end thereof. The same symbols 11 and 12 are placed on the erector lens 3 near the receiving end thereof. However, neither the Barlow lens 2 or the erector lens 3 are optically compatible with the zoom lens 8, nor are they optically compatible with each other. Therefore, neither the triangle symbol 13 which represents the erector lens 3 nor the hexagon symbol 16 which represents the zoom lens 8 are placed on the Barlow lens 2. Similarly, neither the circle symbol 14, which represents the Barlow lens 2, nor the hexagon symbol 16, which represents the zoom lens 8 are placed on the erector lens 3.

The telescope viewing end 1 includes symbols for each optical accessory type which is capable of direct insertion into the receiver thereof. Thus, the square symbol 12 representing the prismatic diagonal 4, the triangle symbol 13 representing the erector lens 3, the circle symbol 14 representing the Barlow lens 2, and the pentagon symbol 15 representing the penta mirror diagonal 5 area are placed on the telescope near the telescope viewing end 1. However, since, for practical reasons, the zoom lens 8 is not usable directly with the telescope viewing end 1, the hexagon symbol 16 is not placed on it.

The inventive coding system and method thus clearly indicates to a user, in an economical and easily understandable way, which of the telescope optical accessories 2–8 are optically compatible with each other and directly with the telescope viewing end 1.

It should be understood that the inventive coding system and method can be expanded to a number of other optical telescope accessories with the symbol list expanded accordingly. It should further be understood that the symbols 11–6 illustrated and described herein are merely an example and any other suitable symbols, icons, colors, shapes, etc. can be used to identify each accessory and to indicate which accessories are compatible with that accessory. For example, icons can be used which symbolically represent each accessory or color bands can be placed around each accessory with each color representing a different accessory. These icons, symbols or colors, etc. can be placed on each accessory and on the telescope itself via stick-on labels, paint, by engraving or any other suitable method. Thus, the term "symbol" as used in the claims is intended to broadly cover each of these variations, among others. Furthermore, the particular positions illustrated for placement of the symbols 11–16 on the telescope and accessories 1–8 is also exemplary only, and should not be considered limiting. For example, placement of symbols or colors could be done on the insertion barrels rather than the optical bodies or symbols can completely ring the receiving accessory rather than being stacked horizontally, as has been shown here for convenience of illustration. While the telescope illustrated and described herein is an astronomical telescope, the inventive coding system could be used with other telescope types or with other types of optical instruments which can incorporate optical accessories, such as binoculars, microscopes, still cameras, video cameras, projectors, etc. Other variations will occur to those of ordinary skill in the art without affecting the viability of the invention. It is thus to be understood that while certain forms of the present invention have been illustrated and described herein, it is not to be limited to the specific forms or arrangement of parts described and shown.

We claim:

1. An optical instrument and accessory coding system for an optical instrument and a plurality of optical accessories of differing accessory types, at least some of said accessory types being receiving types capable receiving others of said accessory types such that they are placed in optical series with each other, and with certain ones of said accessory receiving types being optically compatible with some other accessory types but being optically incompatible with other accessory types, said coding system comprising:

a. a plurality of symbols, each of which uniquely represents a respective type of optical accessory, each optical accessory of that type including a representation of the particular symbol identifying its accessory type placed thereon; and b. each accessory of a receiving accessory type also including a representation of each symbol which identifies another accessory type with which it is optically compatible.

2. An optical instrument and accessory coding system as in claim 1, wherein some of said accessory types are usable by direct insertion into a viewing end of the optical instrument while others of said accessory types are not usable by direct insertion into the viewing end of the optical instrument, said system further comprising:

a. the optical instrument itself including a representation of each of the symbols identifying accessory types which are usable by direct insertion therein.

3. An optical instrument and accessory coding system as in claim 2, wherein said optical instrument is a telescope and said accessory types include one or more of the following types:

a. prismatic diagonals;
 b. ocular eyepieces;
 c. Barlow lenses;
 d. erector lenses;
 e. zoom lenses; and
 f. penta mirror diagonals.

4. An optical instrument and accessory coding system as in claim 3, wherein said telescope is an astronomical telescope.

5. An optical instrument and accessory coding system as in claim 1, wherein:

a. each of said representations of a symbol which identifies a type of accessory is placed on accessories of that type near an insertion or objective end thereof.

6. An optical instrument and accessory coding system as in claim 1, wherein:
   a. each of said representations of each of the symbols identifying other accessory types which are optically compatible therewith is placed near a viewing or receiving end of each accessory of a receiving accessory type.

7. A telescope and accessory coding system for a telescope and a plurality of optical accessories of differing accessory types, at least some of said accessory types being receiving types capable of receiving others of said accessory types such that they are placed in optical series with each other, and with certain ones of said accessory receiving types being optically compatible with some of the other types but being optically incompatible with other accessory types, said coding system comprising:
   a. a plurality of symbols, each of which uniquely represents a respective type of optical accessory, each optical accessory of that type including a representation of the symbol identifying its accessory type placed thereon; and
   b. each accessory of a receiving accessory type also including a representation of each symbol which identifies another accessory type with which it is optically compatible.

8. A telescope and accessory coding system as in claim 7, wherein some of said accessory types are usable by direct insertion into a viewing end of the telescope while others of said accessory types are not usable by direct insertion into the viewing end of the telescope, said system further comprising:
   a. the telescope itself including a representation of each symbol which identifies an accessory type which is usable by direct insertion therein.

9. A telescope and accessory coding system as in claim 7, wherein said accessory types include one or more of the following types:
   a. prismatic diagonals;
   b. ocular eyepieces;
   c. Barlow lenses;
   d. erector lenses;
   e. zoom lenses; and
   f. penta mirror diagonals.

10. A telescope and accessory coding system as in claim 7, wherein said telescope is an astronomical telescope.

11. A telescope and accessory coding system as in claim 7, wherein:
    a. each said representation of a symbol which identifies a type of accessory is placed on accessories of that type near an insertion or objective end thereof.

12. A telescope and accessory coding system as in claim 7, wherein:
    a. each of said representations of each of the symbols identifying other accessory types which are optically compatible therewith is placed near a viewing or receiving end of each accessory of a receiving accessory type.

13. A method of insuring optical compatibility between optical accessories for a system including a telescope and a plurality of optical accessories of differing accessory types, at least some of said accessory types being receiving types capable of receiving others of said accessory types such that they are placed in optical series with each other, and with certain ones of said accessory receiving types being optically compatible with some of the other types but being optically incompatible with other accessory types, said method comprising the steps of:
    a. providing a plurality of symbols, each of which uniquely represents a respective type of optical accessory;
    b. placing a representation of the symbol identifying its accessory type on each of said accessories; and
    c. placing a representation of each symbol which identifies another accessory type with which a particular receiving accessory type is optically compatible on each accessory of that receiving accessory type.

14. A method as in claim 13, wherein some of said accessory types are usable by direct insertion into a viewing end of the telescope while others of said accessory types are not usable by direct insertion into the viewing end of the telescope, said method further comprising the step of:
    a. placing on the telescope a representation of each symbol which identifies an accessory type which is usable by direct insertion into the telescope.

15. A method as in claim 13, wherein said providing step includes providing a unique symbol for one or more of the following accessory types:
    a. prismatic diagonals;
    b. ocular eyepieces;
    c. Barlow lenses;
    d. erector lenses;
    e. zoom lenses; and
    f. penta mirror diagonals.

16. A method as in claim 13, wherein the first placing step includes placing each said representation of a symbol which identifies a type of accessory on accessories of that type near an insertion or objective end thereof.

17. A method as in claim 13, wherein the second placing step includes placing a representation of each symbol which identifies another accessory type which is optically compatible therewith near a viewing or receiving end of each accessory of a receiving accessory type.

* * * * *